Sept. 19, 1961 J. M. JACQUE 3,000,639

STYLUS SECURING MEANS FOR PHONOGRAPH PICKUP CARTRIDGES

Filed Feb. 18, 1959

INVENTOR

JAMES M. JACQUE

BY *Francis J. Klempay*

ATTORNEY 3,000,639

STYLUS SECURING MEANS FOR PHONOGRAPH PICKUP CARTRIDGES

James M. Jacque, Conneaut, Ohio, assignor to The Astatic Corporation, Conneaut, Ohio, a corporation of Ohio Filed Feb. 18, 1959, Ser. No. 794,094
5 Claims. (Cl. 274—37)

The present invention relates generally to the art of recording and reproducing sound and more particularly to the provision of improved stylus securing means for use in phonograph pickup cartridges.

As will be understood by those skilled in the art, a phonograph pickup cartridge comprises a pair of housing halves defining a casing having a cavity therein for the reception of a transducers element, a stylus member carrying a groove engaging tip and a coupling member interconnecting the stylus member with the transducer element. A phonograph pickup cartridge is adapted to be carried at the outer free end of a tone arm whereby the groove engaging tip may accurately track the continuous groove of a record disc, for example. The transducer element is connected by output terminals and suitable conductors to amplifying apparatus and speakers whereby the intelligence recorded in the continuous groove of the record disc is reproduced as audible sound.

The groove engaging tip of a phonograph pickup cartridge is subjected to deterioration and wear even though extremely hard materials, such as osmium, sapphire, ruby or the like, are used because of the severe operating conditions under which it is employed. Therefore, the stylus member must be replaced from time to time since the groove engaging tip is, in general, more fragile and subject to more wear than is the rest of the phonograph pickup cartridge.

In the co-pending application of Maurice M. Palo, Ser. No. 616,152, filed October 16, 1956, which is now matured into U.S. Patent No. 2,957,052 and which is assigned to the assignee of the present invention, there is disclosed a stylus member which is bifurcated at its rear end and this bifurcated or fork-like rear end portion is releasably clamped against the casing of a phonograph pickup cartridge by means of a captivated screw. The screw is threadably received in a stylus holder insert which is clamped between the housing halves forming the casing of the phonograph pickup cartridge. In this manner the stylus member is rigidly secured in the phonograph pickup cartridge but yet is easily removable and replaceable in a minimum of time by even an unskilled operator without any chance of losing the component parts. In general, the teachings of the present invention are directed to stylus securing means of the type disclosed in the above identified patent application.

It is a prime or ultimate object of the present invention to provide improved means for securing a stylus member to a phonograph pickup cartridge.

A further object of the invention is the provision of stylus securing means for use in phonograph pickup cartridges wherein it is impossible to lose or misplace any component parts thereof.

Another object of the present invention is to provide stylus securing means for phonograph pickup cartridges wherein the bifurcated rear end portion of the stylus member is resiliently clamped under tension to the casing. In this manner "needle chatter" and other undesirable operating characteristics are eliminated.

Yet a further object of the invention is to provide stylus securing means for phonograph pickup cartridges which, when the stylus member is properly secured in the phonograph pickup cartridge, prevents the stylus member from being removed or dislodged when the same is in operative relation with a record disc or the like. However, as will be hereinafter more fully apparent, the stylus member can be removed and replaced in a minimum of time and with a minimum of effort by even an unskilled operator without the use of special tools.

A further object of the invention is the provision of an improved stylus holder insert which is clamped between the housing halves and is adapted to receive the bifurcated rear end portion of the stylus member.

Yet a further object of the invention is to provide stylus securing means for phonograph pickup cartridges which is characterized by its extreme simplicity and low cost of manufacture, assembly and use.

These, as well as other objects and advantages of the invention, will become more readily apparent upon consideration of the following specification and accompanying drawing wherein there is disclosed a preferred embodiment of the invention.

Figures 1, 2:
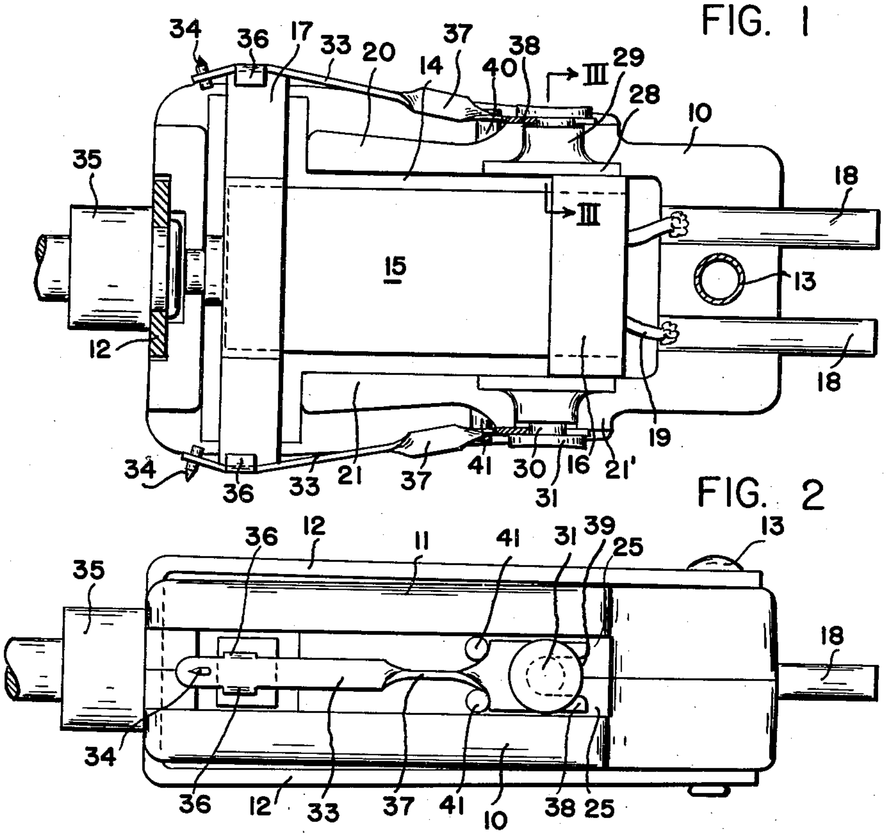
FIGURE 1 is an enlarged longitudinal sectional view of a phonograph pickup cartridge embodying stylus securing means constructed in accordance with the teachings of the present invention.
FIGURE 2 is a bottom plan view of a phonograph pickup cartridge shown in FIGURE 1.

Referring now to the drawing, and initially to FIGURES 1 and 2 thereof, the reference numerals 10 and 11 designate complementary housing halves which are molded or otherwise formed from plastic or the like. The housing halves 10 and 11 are secured together by a fork-like metal band 12 and a tubular rivet 13 which extends through these housing halves adjacent the rear ends thereof. The assembled housing halves 10 and 11 define a casing having an elongated internal cavity 14 for the reception of the transducer element 15. The rear end portion of the transducer element 15 is fixedly clamped by a pair of transversely extending resilient clamping pads 16 while the front end portion thereof mounts a compliant coupling member 17. A pair of output terminals 18 are clamped between and extend from the housing halves 10 and 11 and are connected by leads 19 to the output electrodes of the transducer element 15.

Figure 4:
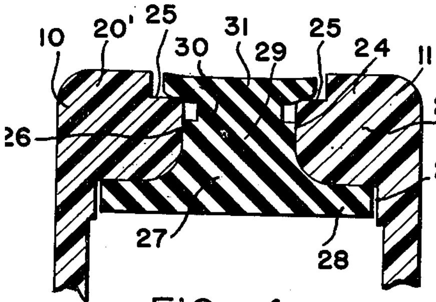
FIGURE 4 is an enlarged fragmentary side sectional view similar to FIGURE 3 with the stylus member removed.

Each of the housing halves 10 and 11 is provided with upper and lower walls 20 and 21, respectively, which have portions of greater thickness 20' and 21' intermediate the ends thereof. In each of the housing halves at the thickened portions 20' and 21' there are provided a pair of recesses and each of these recesses has an enlarged and generally rectangular portion 23 and a circular portion 24 of reduced diameter which terminates in a longitudinally extending channel 25 formed in the outer edge of the housing section. It will thus be seen that when the housing halves 10 and 11 are assembled the recesses formed in the thickened portions 20' and 21' cooperate to define a pair of openings 26 on opposite sides of the cavity 14 in the casing having the shapes shown in the various views of the drawing and as described above. Received within each of the openings 26 is a stylus holder insert 27 whose function is to securely and resiliently clamp the rear end portions of one of the stylus members to the casing. The stylus holder inserts 27 are molded or otherwise formed from a relatively hard but yet resilient material, such as nylon for example, and have an enlarged and generally rectangular flange portion 28, a circular body portion 29, a short neck portion 30 of reduced diameter with respect to the body portion 29 and an enlarged circular head portion 31. As will be observed in FIGURES 3 and 4 of the drawings, the stylus holder inserts 27 are adapted to be nestingly clamped within the openings 26 when the housing halves 10 and 11 are assembled. The head portions 31 of the stylus holder inserts are adapted to rest against the longitudinally extending channels 25 of the openings 26. For reasons to be hereinafter more fully explained, the openings 26 and the stylus holder inserts 27 are so relatively dimensioned that when the housing halves are assembled the head portions 31 of the inserts are under tension and press against the longitudinally extending channels 25. This is shown in FIGURE 4 of the drawing.

The phonograph pickup cartridge further comprises a pair of elongated stylus members 33 which are preferably stamped from a sheet of spring-like material, such as Phosphor bronze, for example. The forward end of each of the stylus members 33 is bent and mounts a groove engaging tip 34 which, when the stylus members are properly secured in the phonograph pickup cartridge as shown in FIGURE 1, is adapted to ride in the continuous spirally cut groove of a phonograph record disc, not shown. The groove engaging tips 34 may be made from any suitable wear resistant material and may be of different diameters. The phonograph pickup cartridge is provided with a suitable mounting stud 35 whereby the same may be properly mounted and journaled in the free end of a phonograph tone arm, not shown, in a manner well known in the art. Thus, one of the groove engaging tips 34 may be of a diameter adapted for playing record discs with standard size grooves which usually rotate at 78 r.p.m. while the other groove engaging tip may be adapted for playing record discs with microgrooves which usually rotate at either 45 r.p.m. or 33⅓ r.p.m.

Rearwardly of the groove engaging tips 34 each of the stylus members is provided with an integral pair of upturned tabs 36 adapted to engage the tapered end of the resilient coupling member 17 to provide a driving connection between the groove engaging tip 34 and the transducer element 15. Intermediate the ends of each of the stylus members there are provided twisted portions 37 which extend normally with respect to the general planes of the styli 34. The function of the twisted portions 37 is to contribute mechanical compliance to lateral forces exerted on the stylus members and the degree of such compliance can be controlled by the size and extent of the twisted portions 37. At the rear end of each of the stylus members 33 there is a wider portion 38 having an open ended slot 39 to define a bifurcation or yoke-like extension which is adapted to be secured under the head portions 31 of one of the stylus holder inserts 27.

Figure 3:
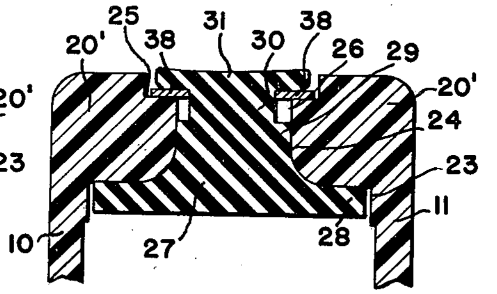
FIGURE 3 is an enlarged fragmentary side sectional view taken along the section line 111—111 of FIGURE 1 showing specifically the stylus securing means.
Figure 5:
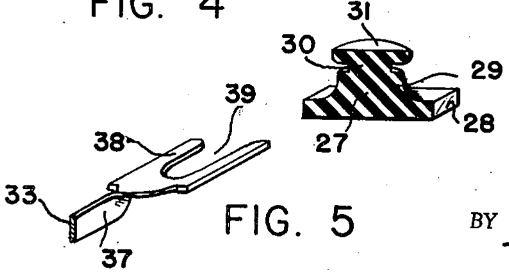
FIGURE 5 is an exploded fragmentary view, partially in section, of the stylus holder insert and the stylus member forming a portion of the stylus securing means of the present invention.

As set forth above, the head portions 31 of the stylus holder inserts 27 are under tension and bear against the longitudinally extending channels 25 formed in the housing halves when the stylus members 33 are not operatively mounted in the phonograph pickup cartridge. This is clearly shown in FIGURE 4 of the drawing. The fork-like projections of the bifurcated rear end portions 38 of the stylus members 33 are adapted to be slidably received underneath the head portions 31 of the stylus holder inserts 27. This is shown in FIGURE 3 of the drawing and it will be noted that when the fork-like projections of the stylus members 33 are inserted under the head portions 31 that the resilient stylus holder inserts 27 will be further deformed to forcibly clamp the bifurcated rear end portions of the stylus members directly against the longitudinally extending channels 25 formed in the casing.

In one constructed embodiment of the present invention the openings 26 and the stylus holder inserts 27 were so relatively dimensioned that when the housing halves 10 and 11 were assembled the head portions 31 of the stylus holder inserts 27 were each displaced by .005 of an inch to forcibly bear against and exert a tension upon the associated longitudinally extending channels 25. The stylus members 33 each were of a thickness dimension equal to a .007 of an inch and when the styli were inserted each of the head portions 31 of the stylus holder inserts 27 were displaced a total of .012 of an inch to firmly clamp the bifurcated end portions of the stylus members directly to the casing of the phonograph pickup cartridge. It was observed that when the bifurcated rear end portions of the stylus members were inserted under the head portions of the stylus holder inserts that these head portions became slightly and concavely dished while the neck portions 30 were elongated and stretched. The arrangement was such that the bifurcated rear end portions of the stylus members were firmly and resiliently clamped against the casing whereby "needle chatter" and other undesirable operating characteristics due to loose stylus members were completely eliminated.

Integrally formed on each of the housing halves 10 and 11 and positioned forwardly of the thickened portions 20′ and 21′ of the side walls 20 and 21 are a pair of oppositely directed and vertically extending pins or lugs 40 and 41. When the housing valves are assembled the pins 40 and 41 cooperate to provide two pairs of transversely spaced vertically extending pins each of which is adjacent and spaced slightly forward of one of the stylus holder inserts 27. It will be noted that the pairs of pins 40 and 41 project beyond the normal surfaces of the longitudinally extending channels 25 formed in the housing halves. The pairs of pins 40 and 41 provide, in essence, stop means which prevent the removal of the stylus members when the same are in operative relation with a phonograph record disc.

The pairs of pins 40 and 41 are so positioned that when the stylus members are operatively mounted in the phonograph pickup cartridge that they form abutment stops adapted to be engaged by the outwardly flaring side edges of the enlarged and bifurcated rear end portions 38 of the stylus members 33. In this manner forward movements of the stylus members are prohibited when the stylus members are operatively coupled in the phonograph pickup cartridge. The stylus members will not slip forward due to drag experienced in playing record discs. This drag, or force tending to move the stylus members forwardly with respect to the phonograph pickup cartridge, is most pronounced when playing record discs which are rotated at higher speeds and/or when heavy needle pressures are employed. Also, the above described arrangement prevents removal or loosening of the stylus members due to rough handling such as accidentally drawing one of the groove engaging tips 34 across the face of a record disc. Further, the neck portions 30 of the stylus holder inserts 27 form rear abutment stops so that the stylus members cannot move rearwardly with respect to the phonograph pickup cartridge. Thus, once the stylus members are operatively mounted both forwardly and rearwardly movements thereof are precluded.

Although the stylus members are very effectively mounted in the phonograph pickup cartridge whereby the same cannot be displaced during normal usage thereof, the stylus members may be removed and replaced with upmost ease in a minimum of time and with a minimum of effort. To remove one of the stylus members it is only necessary to engage the same adjacent the pair of tabs 36 and bend the same vertically until the outwardly flaring side edges of the bifurcated rear end portion 38 clear the ends of the associated pair of pins 40 or 41. Then the stylus member can be moved forwardly to remove the fork-like projections of the bifurcated rear end portion thereof from underneath the head portion 31 of the stylus holder insert 27.

In replacing the stylus member the above described steps are followed in reverse until the fork-like projections of the bifurcated rear end portion are seated beneath the head portion 31 of the stylus holder insert 27. In replacing the stylus member the vertical sidewalls of the longitudinally extending channels 25 provide means for guiding the bifurcated rear end portion of the member into proper clamped relation under the head portion 31 of the stylus holder insert 27. Both the removal and replacement operations are characterized by their extreme simplicity whereby the same may be carried out by a relatively unskilled owner of the phonograph apparatus rather than by a service man. It will be understood that the component parts involved in a phonograph pickup cartridge are extremely small and in conventional prior art apparatus the possibility has always existed of losing and/or misplacing the removable screw or other like stylus securing means. Such a possibility is completely eliminated in the apparatus of the present invention since the stylus holder inserts 27 are firmly clamped between the housing halves and cannot be removed or even turned due to the rectangular shapes of the enlarged portions 23 of the openings 26 and the flange portions 28 of the stylus holder inserts 27.

A further important aspect of the stylus securing means of the present invention is its extreme simplicity in manufacture and assembly. It will be noted that the use of screws, pins and other like component parts which have characterized prior apparatus are completely eliminated. This substantially reduces the cost of manufacturing and assembling the resultant phonograph pickup cartridge whereby the same is better adapted to serve the mass market.

It should thus be apparent that the objects initially set forth have been accomplished. Although there has been shown and described a preferred embodiment of the present invention, it should be understood that many changes may be made therein without departing from the teachings of the invention.

Accordingly, reference should be had to the following appended claims in determining the true scope and intent of the present invention.

I claim:

1. Stylus holding means for use in a phonograph pickup cartridge comprising a pair of housing halves and in securing the bifurcated rear end defining a pair of arms of an elongated and replaceable thin stylus member to said phonograph pickup cartridge which comprises a resilient body of elastomeric material formed with an enlarged first end, an enlarged second end and a center portion of reduced size, said enlarged first end being resiliently clamped between said housing halves whereby the same is anchored with respect to said phonograph pickup cartridge, said enlarged second end projecting from said phonograph pickup cartridge, said center portion being adapted to slidably receive said pair of arms of said bifurcated rear end upon movement of said stylus member in a direction transverse to the direction of extent of said resilient body, and said enlarged second end resiliently bearing against said arms to continuously urge the same against said housing halves when said arms are positioned on opposite sides of said center portion.

2. Apparatus according to claim 1 further characterized in that said phonograph pickup cartridge comprises outwardly projecting abutment means positioned forwardly of said resilient body, and said abutment means engaging side portions of said stylus member when said arms are positioned in operative relation on opposite sides of said center portion to prevent accidental movement of the same in said direction transverse to said direction of extent of said resilient body.

3. Stylus holding means for use in securing the rear end of an elongated and replaceable thin stylus member to a phonograph pickup cartridge which comprises a resilient body of elastomeric material, said body being secured in said phonograph pickup cartridge, said body having an enlarged end and a portion of reduced size projecting from said phonograph pickup cartridge, said rear end of said stylus member being received about said portion of reduced size beneath said enlarged end when said stylus member is operatively mounted in said phonograph pickup cartridge, said large end of said resilient body resiliently bearing against the rear end of said stylus member when the same is operatively mounted in said phonograph pickup cartridge to continuously urge said stylus thereagainst, outwardly projecting abutment means positioned forwardly of said resilient body, said stylus member being adapted to be removed by drawing the same forwardly whereby said rear end is moved from beneath said enlarged end, and said abutment means engaging side portions of said stylus member to prevent accidental removal of the same when said stylus member is operatively mounted in said phonograph pickup cartridge.

4. Apparatus according to claim 3 further characterized in that said stylus member comprises an elongated reach of resilient strip material comprising a body portion and said rear end, said rear end of said stylus member being enlarged and bifurcated to define a pair of rearwardly projecting arms, and the side surfaces joining said arms to said body portion defining said side portions.

5. Apparatus according to claim 3 further characterized in that said abutment means comprises a pair of projecting pins disposed on opposite sides of said stylus member.

References Cited in the file of this patent

UNITED STATES PATENTS

| | | |
|---|---|---|
| 2,553,492 | Weil | May 15, 1951 |
| 2,652,260 | Bauer | Sept. 15, 1953 |
| 2,849,239 | Dieter et al. | Aug. 26, 1958 |
| 2,939,716 | Bauer | June 7, 1960 |

FOREIGN PATENTS

| | | |
|---|---|---|
| 1,026,979 | Germany | Mar. 27, 1958 |
| 1,088,374 | France | Sept. 8, 1954 |

OTHER REFERENCES

"Acoustical Engineering," H. F. Olson, D. Van Nostrand Co., Inc., 1957. (Copy in Div. 16.)